United States Patent
Choi et al.

(10) Patent No.: US 6,801,265 B2
(45) Date of Patent: Oct. 5, 2004

(54) LIQUID CRYSTAL DISPLAY HAVING SHORTING BAR FOR TESTING THIN FILM TRANSISTOR

(75) Inventors: Seung-Kyu Choi, Daegu (KR); Hyun-Tae Kim, Kyoungeangbuk-Do (KR)

(73) Assignee: LG. Phillips LCD Co., Ltd., Seoul (KR)

( * ) Notice: Subject to any disclaimer, the term of this patent is extended or adjusted under 35 U.S.C. 154(b) by 0 days.

(21) Appl. No.: 10/327,899

(22) Filed: Dec. 26, 2002

(65) Prior Publication Data

US 2003/0122976 A1 Jul. 3, 2003

(30) Foreign Application Priority Data

Dec. 28, 2001 (KR) .......................... 2001-87415

(51) Int. Cl.[7] ...................... G02F 1/1333; G02F 1/1343
(52) U.S. Cl. ........................... 349/40; 349/54; 349/139
(58) Field of Search ............................ 349/40, 54, 139, 349/84

(56) References Cited

U.S. PATENT DOCUMENTS

| 2001/0045997 | A1 | * | 11/2001 | Kim | ............................ 349/40 |
| 2002/0027621 | A1 | * | 3/2002 | Chae | ........................... 349/40 |
| 2002/0044228 | A1 | * | 4/2002 | Oh et al. | ....................... 349/40 |
| 2002/0085138 | A1 | * | 7/2002 | Kim et al. | ..................... 349/43 |
| 2002/0089614 | A1 | * | 7/2002 | Kim | ............................ 349/40 |
| 2003/0117165 | A1 | * | 6/2003 | Kim | ........................... 324/770 |

FOREIGN PATENT DOCUMENTS

| KR | 10-0244449 B1 | 2/2000 |
| KR | 10-0271038 B1 | 11/2000 |

* cited by examiner

*Primary Examiner*—Robert H. Kim
*Assistant Examiner*—Mike Qi
(74) *Attorney, Agent, or Firm*—Birch, Stewart, Kolasch & Birch, LLP (57) ABSTRACT

A liquid crystal display device has a shorting bar for testing a thin film transistor. First and second source shorting bars are alternatively at lest two-by-two connected to source pads, and at least two adjacent pixel electrodes are scanned by being recognized as one, so that an active panel of a high resolution product with a fine isolation distance between pixel electrodes and area can be tested.

15 Claims, 11 Drawing Sheets

LIQUID CRYSTAL DISPLAY HAVING SHORTING BAR FOR TESTING THIN FILM TRANSISTOR

This application claims priority of Korean Patent Application No. 87415/2001 filed Dec. 28, 2001, under 35 U.S.C. §119, which is herein fully incorporated by reference.

BACKGROUND OF THE INVENTION

1. Field of the Invention

The invention relates to an active matrix liquid crystal display device having an active panel on which a thin film transistor (TFT) and a pixel electrode connected to the TFT are arranged in a matrix. Especially, the invention relates to a high resolution liquid crystal display device having a shorting bar for testing a thin film transistor.

2. Description of the Background Art

Thin film type flat display devices are under intensive development thanks to their ergonomic advantages of being easily used at any location. Especially, liquid crystal display devices have high resolution and reaction speeds sufficiently fast to realize a mobile image.

Liquid crystal display devices are based on the exploitation of optical anisotropy and polarizability of liquid crystals. That is, by artificially controlling an orientation direction of liquid crystal molecules which has a direction by using their dielectric anisotropy, light can be transmitted or blocked by the optical anisotropy according to the orientation direction. This phenomenon is applied for use in a screen display device.

Currently, an active matrix liquid crystal display device, in which a thin film transistor and a pixel electrode connected thereto are arranged in a matrix form, has wide use thanks to its excellent picture quality.

The structure of a conventional liquid crystal display device will now be described.

One panel (or a color filter panel) of the liquid crystal display device has a structure that red, blue and green color filters are sequentially disposed at the position of pixels on a transparent substrate. A black matrix is formed in mesh form between the color filters. A common electrode is formed on the color filter.

The other panel of the liquid crystal display device has a structure such that pixel electrodes are arranged at portions of pixels designed in matrix form on a transparent substrate.

Signal lines are formed in a horizontal direction of the pixel electrodes, and data lines are formed in a vertical direction of the pixel electrodes.

A thin film transistor is formed at a corner of the pixel electrode to drive the pixel electrode. A gate electrode of the thin film transistor is connected to the signal line (thus, it is also called a gate line), and a source electrode of the thin film transistor is connected to the data line (thus, it is also called a source line).

A pad part is formed at an end of each line to connect the line to an external driving circuit.

The two panels are attached facing one another with a specified space therebetween (the space is called a cell gap), in which liquid crystal material is filled.

In fabricating the active panel of the liquid crystal display device, a method of forming the shorting bar for testing the driving state of each element simultaneously in the process of fabricating the elements will now be described.

Figure 1:
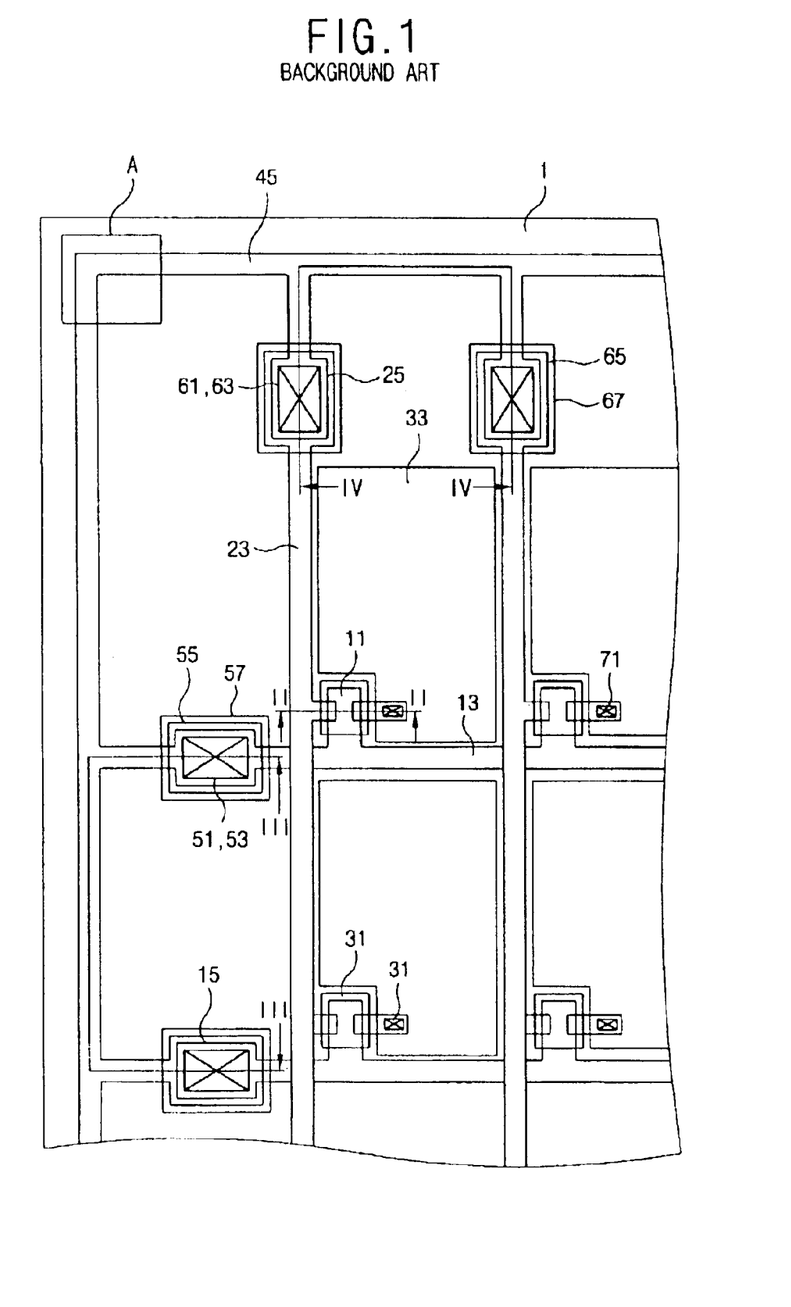
FIG. 1 shows a plane structure of one part of a general active substrate having a shorting bar for testing a thin film transistor.

FIG. 1 shows a conventional plane structure of one part of the active substrate. FIGS. 2A through 2E show conventional sequential section structures in fabricating the active substrate taken along line II—II of FIG. 1. FIGS. 3A through 3E show conventional sequential section structures in fabricating the active substrate taken along line III—III of FIG. 1. FIGS. 4A through 4E show conventional sequential section structures in fabricating the active substrate taken along line IV—IV of FIG. 1.

As shown in FIGS. 1, 2A, 3A and 4A, aluminum or aluminum alloy is deposited on a transparent substrate 1 and patterned to form a gate electrode 11, a gate line 13, a gate pad 15, a source pad 25 and a shorting bar 45.

The gate lines 13 are isolatedly arranged in line, and the gate electrode 11 is formed by being extended from a certain position of the gate line 13. The gate pad 15 is formed at an end of the gate line 13, and the source pad 25 is formed at an end of the source line 23 (to be formed later). The shorting bar 45 is formed at an outer circumference of the substrate 1 and connects the gate pad 15 and the source 25.

In general, a hillock can easily grow on the surface of a metal layer containing aluminum, thereby causing trouble when other materials are afterwards stacked on the metal layer.

Thus, in order to prevent a hillock from forming, the metal layer is anodized to form an anodized film 19. At this time, since the gate electrode 11, the gate line 13, the gate pad 15 and the source pad 25 are connected to each other through the shorting bar 45, it is suitable for anodic oxidation.

In this respect, however, current can scarcely penetrate the anodized surface. Thus, anodic oxidation is preferably not performed on the gate pad 15 to be connected to an external terminal and the source pad 25. For this, a film is formed on the gate pad 15 and the source pad 25 by using a photoresist to prevent anodic oxidation, and then the anodic oxidation process is performed.

Figure 2A:
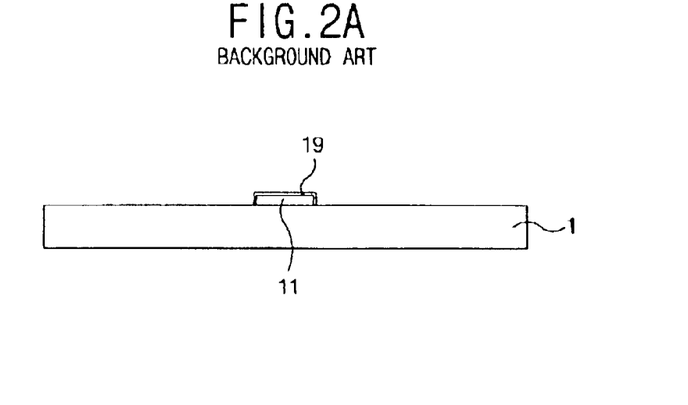
FIGS. 2A through 2E show sequential section structures in fabricating the active substrate taken along line II—II of FIG. 1.

As a result, at the thin film transistor part, as shown in FIG. 2A, the gate electrode 11 including the anodized film is formed at the surface of the substrate 1.

Figure 3A:
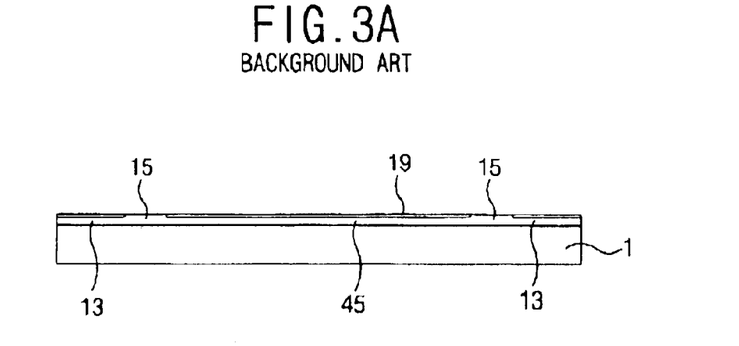
FIGS. 3A through 3E show sequential section structures in fabricating the active substrate taken along line III—III of FIG. 1.

Also, at the part where the gate pad 15 and the shorting bar 45 are formed, as shown in FIG. 3A, the shorting bar 45 and the gate line 13 including the anodized film 19 are formed at the surface of the substrate 1, and the gate pad 15 is formed at the surface of the substrate 1, including no anodized film 19.

Figure 4A:
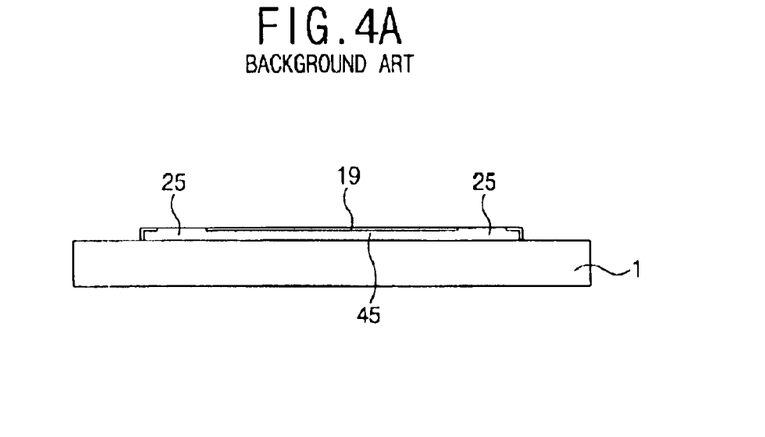
FIGS. 4A through 4E show sequential section structures in fabricating the active substrate taken along line IV—IV of FIG. 1.

At the part where the source pad 25 and the shorting bar 45 are formed, as shown in FIG. 4A, the shorting bar 45 including the anodized film 19 is formed at the surface of the substrate 1, and the source pad 25 is formed at the surface of the substrate 1, such that the source pad 25 includes no anodized film 19.

Figure 2B:
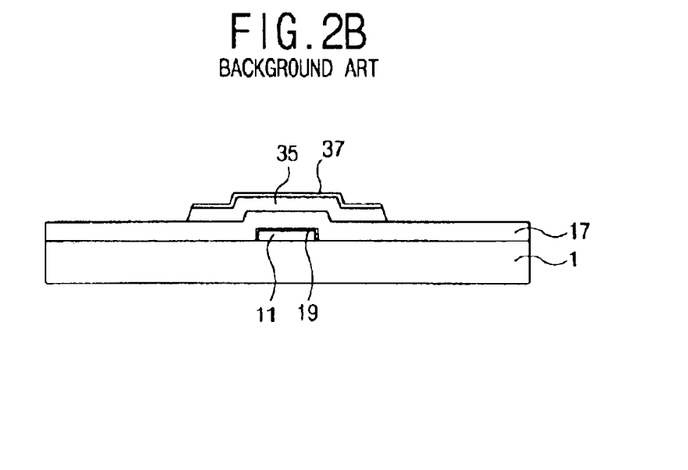
Figure 3B:
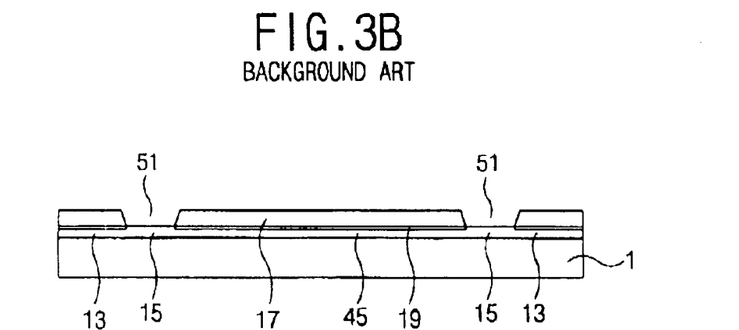
Figure 4B:
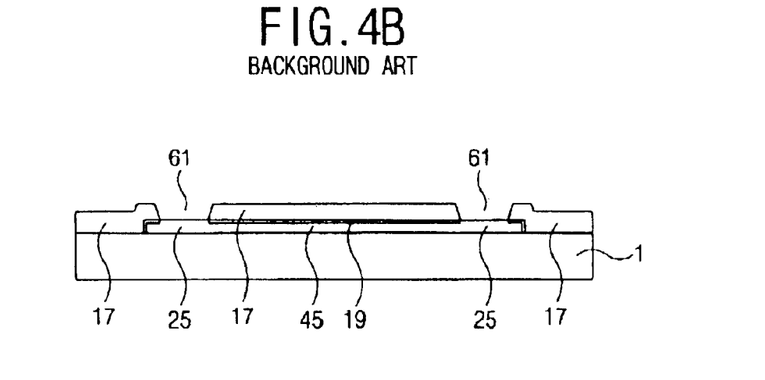

With reference to FIGS. 2B, 3B and 4B, silicon oxide or silicon nitride is deposited at the entire surface of the substrate 1 with the gate electrode 11, the gate line 13, the gate pad 15, the source pad 25 and the shorting bar 45 formed thereon, so as to form a gate insulation film 17.

FIG. 2B shows an intrinsic semiconductor material and a doped semiconductor material containing an impurity are formed in succession on the gate insulation film 17, and then patterned by using photolithography to form a semiconductor layer 35 and an impurity semiconductor layer 37 at that part of the thin film transistor.

And then, as shown in FIGS. 3B and 4B, the gate insulation film 17 at the part covering the gate pad 15 and the source pad 25 is etched to form first gate contact holes 51 and first source contact holes 61.

The first gate contact holes 51 expose the non-anodized portion of the gate pad 15. The first source contact holes 61 expose the non-anodized portion of the source pad 26.

Figure 2C:
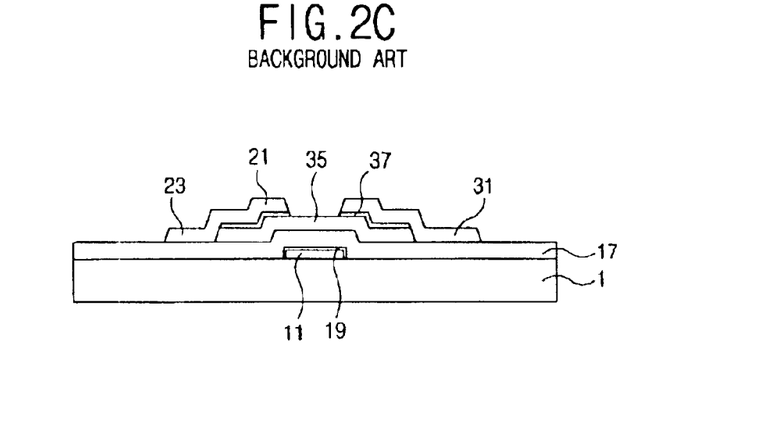
Figure 3C:
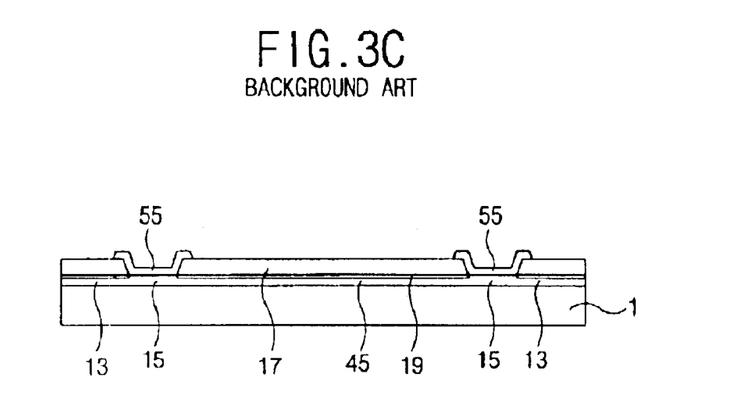
Figure 4C:
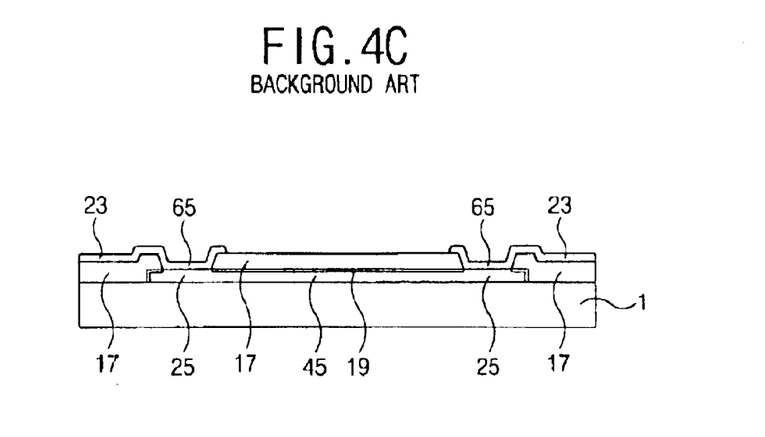

With reference to FIGS. 2C, 3C and 4C, a metal such as chromium is deposited on the entire surface of the substrate with the semiconductor layer 35 and the impurity semiconductor layer 37 formed thereon. Then, patterning forms a source electrode 21, a drain electrode 31, a source line 23, a gate pad intermediate electrode 55 and a source pad intermediate electrode 65.

Accordingly, at the part where the thin film transistor is formed, as shown in FIG. 2C, the source electrode 21 and the drain electrode 31 are patterned to face each other over the gate electrode 11. The impurity semiconductor layer 37 exposed through the source electrode 21 and the drain electrode 31 is etched so that the source electrode 21 and the drain electrode 31 can be electrically isolated.

At the part where the gate pad 15 is formed, as shown in FIG. 3C, the gate pad intermediate electrode 55 is connected to the gate pad 15 through the first gate contact holes 51 formed at the gate insulation film 17.

At the part where the source pad 25 is formed, as shown in FIG. 4C, the source pad intermediate electrode 65 is connected to the source pad 25 through the first source contact holes 61 formed at the gate insulation film 17.

Figure 2D:
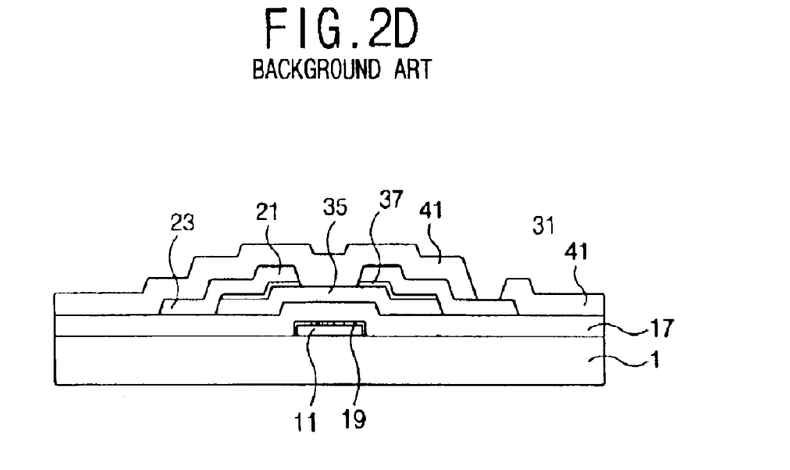
Figure 3D:
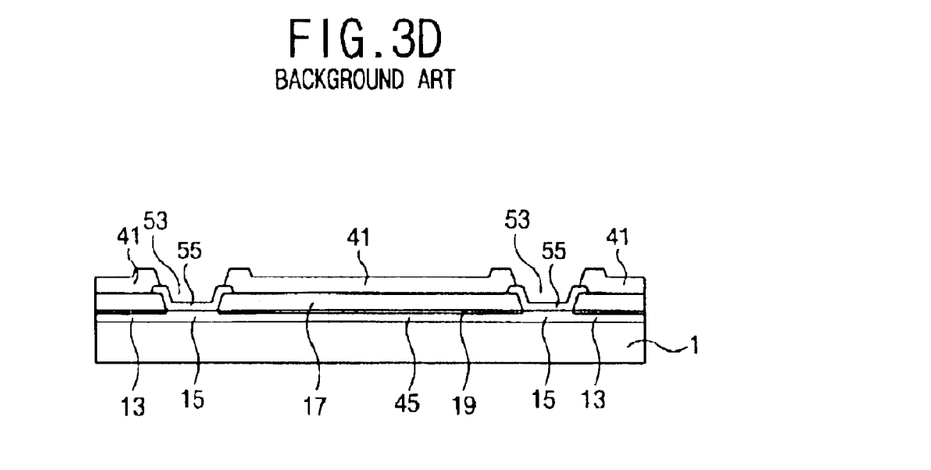
Figure 4D:
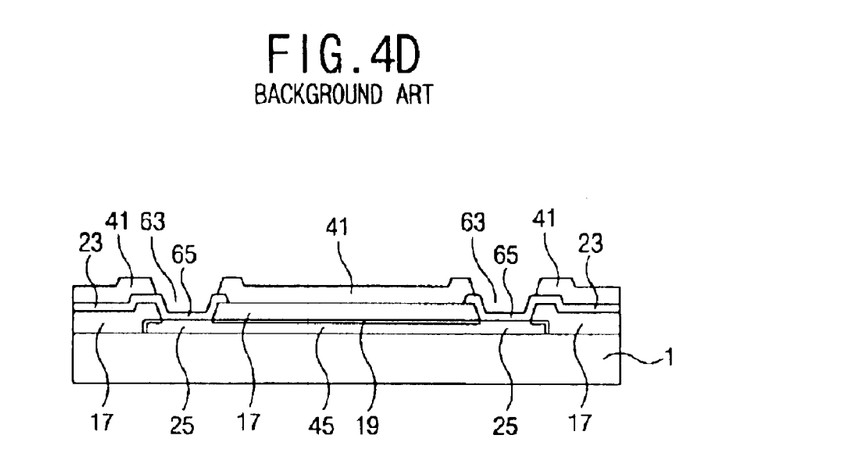

With reference to FIGS. 2D, 3D and 4D, the source electrode 21, a passivation film 41 is formed over the substrate 1 with the source line 23, the drain electrode 31, the gate pad intermediate electrode 55 and the source pad intermediate electrode 65 formed thereon.

Then, at the part where the thin film transistor is formed, as shown in FIG. 2D, a portion of the passivation film 41 is etched by the photolithography to form a drain contact hole 71 exposing a portion of the drain electrode 31.

At the part where the gate pad 15 is formed, as shown in FIG. 3D, a portion of the passivation film 51 is etched by photolithography to form the second gate contact holes 53 exposing a portion of the gate pad intermediate electrode 55.

At the part where the source pad 25 is formed, as shown in FIG. 4D, a portion of the passivation film 41 is etched by photolithography to form the second source contact holes 63 exposing a portion of the source pad intermediate electrode 65.

As the passivation film 41, an inorganic insulation film made of a silicon nitride or silicon oxide material has been conventionally used. Efforts to improve the aperture of a liquid crystal cell includes adopting an organic insulation film such as BCB (benzocyclobutene), SOG (spin on glass), polyacrylics or polymethacrylics as the passivation film.

When forming the conductive films, the cross region ('A' of FIG. 1) connecting the gate pad 15 and the source pad 25 of the shorting bar 45 (to prevent occurrence of static electricity) no longer needs to be connected, so it is selectively removed by etching using photolithography.

As a result, the shorting bar 45 proceeding in the line direction connects the source pads 25 (thus, it is called the source shorting bar). Meanwhile, the shorting bar 45 proceeding in the column direction connects the gad pads 15 (thus, it is called the gate shorting bar).

Figure 2E:
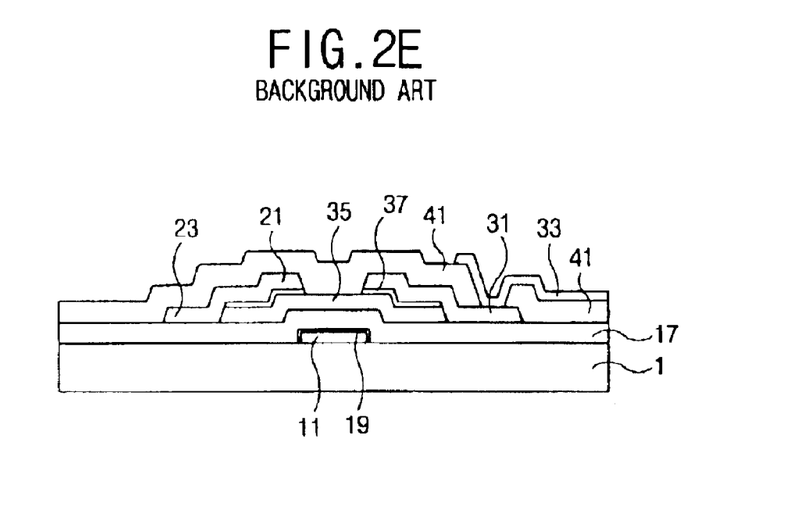
Figure 3E:
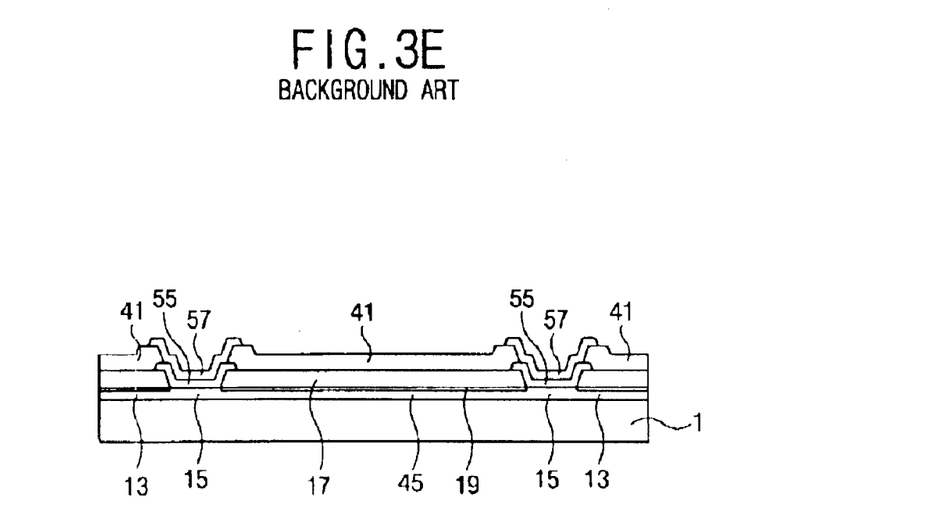
Figure 4E:
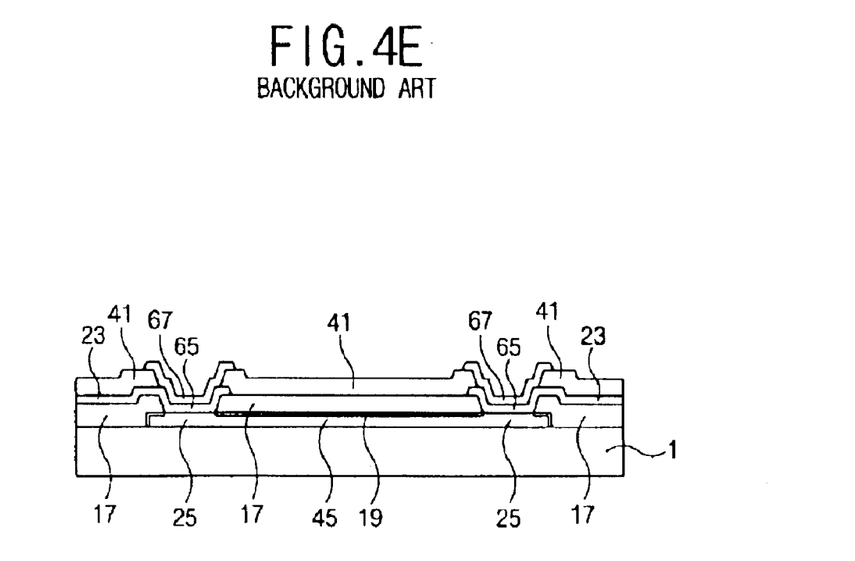

With reference to FIGS. 2E, 3E and 4E, a transparent conductive material such as ITO (Indium Tin Oxide) or IZO (Indium Zinc Oxide) is deposited at the entire surface of the passivation film 41 and patterned by photolithography.

Accordingly, at the part where the thin film transistor is formed, as shown in FIG. 2, the pixel electrode 33 is connected to the drain electrode 31 through the drain contact hole 71.

At the part where the gate pad 15 is formed, as shown in FIG. 3E, a gate pad connection terminal 57 connects to a gate pad intermediate electrode 55 through the second gate contact holes 53.

At the part where the source pad 25 is formed, as shown in FIG. 4E, a source pad connection terminal 67 connects to a source pad intermediate electrode 65 through the second source contact holes 63.

In the conventional active substrate as described above, when the gate line is patterned in order to facilitate the anodic oxidation, the shorting bar for testing the thin film transistor is formed being electrically connected to every gate pad and source pad.

Then, in order for the shorting bar to be connected to the gate pads and the source pads, the cross region of the shorting bar is selectively removed, thereby separating the shorting bar to form a separate gate shorting bar connecting the gate pads and a separate source shorting bar connecting source pads.

The process of testing of the active panel having shorting bar for testing the thin film transistor will now be described.

First, when a gate turn-on voltage is applied to the gate shorting bar, the gate turn-on voltage is applied to the gate of each thin film transistor through every gate pad and every gate line, so that each thin film transistor is turned on.

Next, when a test voltage is applied to the source shorting bar, the test voltage is applied to each source electrode of the thin film transistor through every source pad and every source line of the active panel.

Since the thin film transistor is turned on, the test voltage applied to the source electrode of the thin film transistor is applied to the drain electrode via the conductive channel.

The drain electrode is connected to the pixel electrode, so that the test voltage is resultantly applied to every pixel electrode of the active panel.

Therefore, by scanning whether or not a voltage is applied to the pixel electrode, a open defect of the gate lines or the source lines can be tested.

However, the conventional art has the following shortcomings.

First, if a short occurs between the neighboring gate lines or neighboring source lines, the open defect can not be detected properly.

Second, since the anodic oxidation process and the mask process for removing the cross region of the shorting bar are additionally required, it takes a long time to manufacture a product and product manufacturing cost increases. In addition, an increase in defect occurrence due to mask misalignment degrades the yield.

Therefore, to solve those shortcomings, a low resolution liquid crystal display device having a shorting bar for testing a thin film transistor and capable of detecting short defects of gate lines and source lines and a driving defect of a thin film transistor (when a short occurs between neighboring gate lines or neighboring source lines) while reducing the number of mask processes, have been proposed by the same applicant of the invention (Korean Patent No. 10-0244449 and Korean Patent No. 10-0271038).

The disclosure of Korean Patent No. 10-0244449 and Korean Patent No. 10-0271038 can be described as follows: When gate lines are formed, rather than taking anodic oxidation method to prevent a hillock generating at the surface of aluminum, aluminum is protected with a metal having excellent surface stability (such as chromium), thereby reducing the number of masking processes used in the step of anodic oxidation and in the step of forming the contact hole at the pad part. In addition, the shorting bar for detecting a defect in the gate lines and the source lines is separately formed to odd number lines and even number lines, thereby testing a short defect in each line as well as testing a short defect of two neighboring lines.

Figure 5:
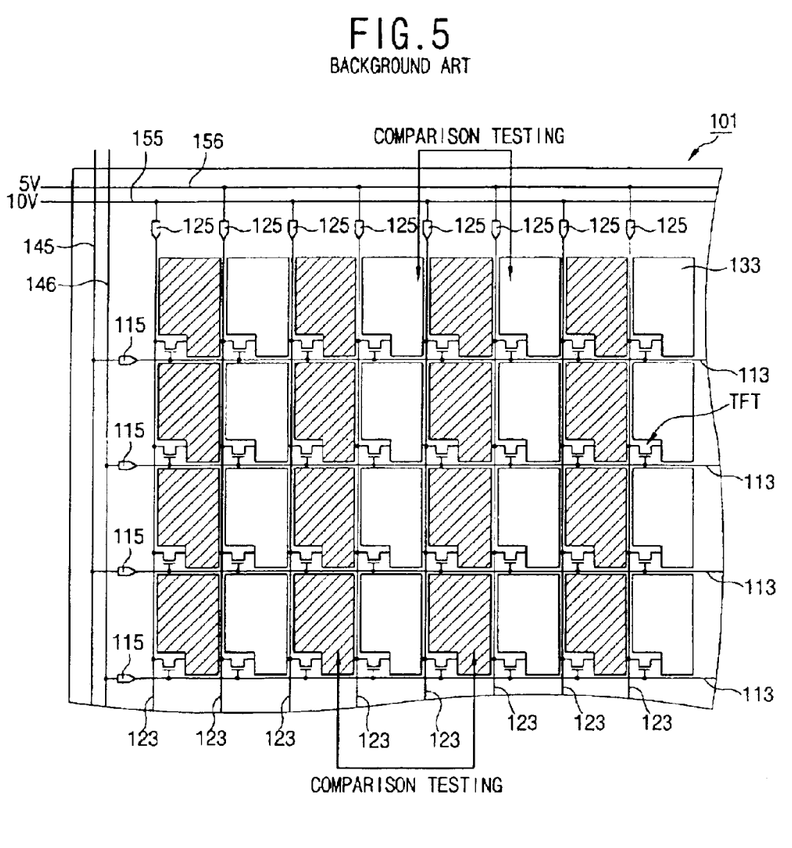
FIG. 5 is an exemplary view showing a liquid crystal display device having a shorting bar for testing a thin film transistor in which shorting bars are separately formed connected to odd number and even number gate lines and source lines in accordance with a conventional art.

That is, with reference to FIG. 5, gate lines 113 are isolatedly arranged in lines on a substrate 101, and source lines 123 are isolatedly arranged in columns. Thus, the gate lines 113 and the source lines 123 intersect each other.

At this time, a unit liquid crystal cell is defined at every intersect portion of the gate lines 113 and the source lines 123, and the unit liquid crystal cell includes a thin film transistor TFT and a pixel electrode 133 connected to a drain electrode (not shown) of the thin film transistor TFT.

Gate pads 115 are formed at each of one ends of the gate lines 113 and connected to the gate lines 113, and first and second gate shorting bars 145 and 146 are formed connected to the gate pads 115. The first gate shorting bar 145 is connected to odd number gate pads 115, while the second gate shorting bar 146 is connected to the even number gate pads 115.

Source pads 125 are formed at each of one ends of the source lines 123 and connected to the source lines 123, and first and second source shorting bars 155 and 156 are formed connected to the source pads 125. The first source shorting bar 155 is connected to the odd number source pads 125 and the second source shorting bar 156 is connected to the even number source pads 125.

The process for testing the active panel having the shorting bar for testing a thin film transistor will now be described.

First, when a turn-on voltage is applied to the first gate shorting bar 145 or to the second gate shorting bar 146, the gate turn-on voltage is applied to the gate of the thin film transistor TFT through the odd number or even number gate pads 115 and the gate lines 113 of the active panel, so that the thin film transistor TFT turns on.

When a test voltage is applied to the first and second source shorting lines, the test voltage is applied to the source electrode of the thin film transistor TFT through the odd number and even number source pads 125 and the source lines 123 of the active panel.

The test voltage applied to the source electrode of the thin film transistor TFT is applied to the drain electrode via the conductive channel of the turned-on thin film transistor TFT. Since the drain electrode is connected to the pixel electrode 133, the test voltage is resultantly applied to the pixel electrode 133 connected to the drain electrode of the turned-on thin film transistor TFT of the active panel.

The test voltage is differently applied to the first and second source shorting bars 155 and 156. That is, for example, 10 V test voltage is applied to the first source shorting bar 155 and 5V test voltage is applied to the second source shorting bar 156.

Since the odd number source pads 125 are connected to the first source shorting bar 155 and the even number source pads 125 are connected to the second source shorting bar 156, the pixel electrodes 133, to which the 10 V test voltage has been applied through the odd number source pads 125 and the source lines 123 connected thereto, are compared to test for a short defect, and the pixel electrodes 133, to which the 5V test voltage has been applied through the even number source pads 125 connected to the second source shorting bar 156 and source lines 123 connected thereto, are compared to test for a short defect.

Therefore, even if a open defect occurs between neighboring source lines 123, the short defect of each source line 123 can be effectively tested, and the open defect of neighboring source lines 123 can be tested.

As described above, the conventional low-resolution liquid crystal display device has shorting bars for testing a thin film transistor in which first and second gate shorting bars are respectively connected to odd number gate pads and even number gate pads, and first and second source shorting bars are respectively connected to odd number source pads and even number source pads. The active channel can be effectively tested in a low-resolution product which is comparatively spacious in terms of isolation distance between pixel electrodes and the area of the pixel electrode. But when it comes to a high resolution product in which the isolation distance between pixel electrodes and the area of the pixel electrode are relatively short and narrow compared to those of the low resolution product, it is not possible to test the active panel.

SUMMARY OF THE INVENTION

The invention, in part, provides a liquid crystal display device having a shorting bar for testing a thin film transistor that is capable of testing an active panel of a high resolution product.

The invention, in part, pertains to a liquid crystal display device having thin film transistors, which contains gate lines and source lines arranged to intersect each other on a substrate, gate pads connected to the gate lines at one ends of the gate lines and source pads connected to the source lines at one ends of the source lines, and first and second source shorting bars at least two-by-two alternately connected to the source pads. The first and second shorting bars can also be three-by-three alternately connected.

The invention, in part, pertains to a liquid crystal display device having gate lines and source lines arranged to intersect each other on a substrate, a unit liquid crystal cell defined at every intersection region of the gate lines and the source lines, a thin film transistor provided in the unit liquid crystal cell and a pixel electrode connected to a drain electrode of the thin film transistor, gate pads connected to the gate lines at one ends of the gate lines and source pads connected to the source pads at one ends of the source lines, first and second gate shorting bars selectively connected to the gate pads, and first and second source shorting bars two-by-two alternately connected to the source pads. The first and second shorting bars can also be three-by-three alternately connected.

The invention, in part, pertains to a method for testing a liquid crystal display device, which includes providing the liquid crystal display device having thin film transistors, the liquid crystal display device comprising gate lines and source lines arranged to intersect each other on a substrate, gate pads connected to the gate lines at one ends of the gate lines and source pads connected to the source lines at one ends of the source lines, and first and second source shorting bars at least two-by-two alternately connected to the source pads. Different high and low test voltages are applied to the first and second source shorting bars, and the method scans, as one, adjacent pixel electrodes to which the same test voltage has been applied, then comparing tests for defects. The high voltage can be 10 volts. The low voltage can be 5 volts.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Advantages of the present invention will become more apparent from the detailed description given herein after. However, it should be understood that the detailed description and specific examples, while indicating preferred embodiments of the invention, are given by way of illustration only, since various changes and modifications within the spirit and scope of the invention will become apparent to those skilled in the art from this detailed description.

Reference will now be made in detail to the preferred embodiments of the present invention, examples of which are illustrated in the accompanying drawings.

Figure 6:
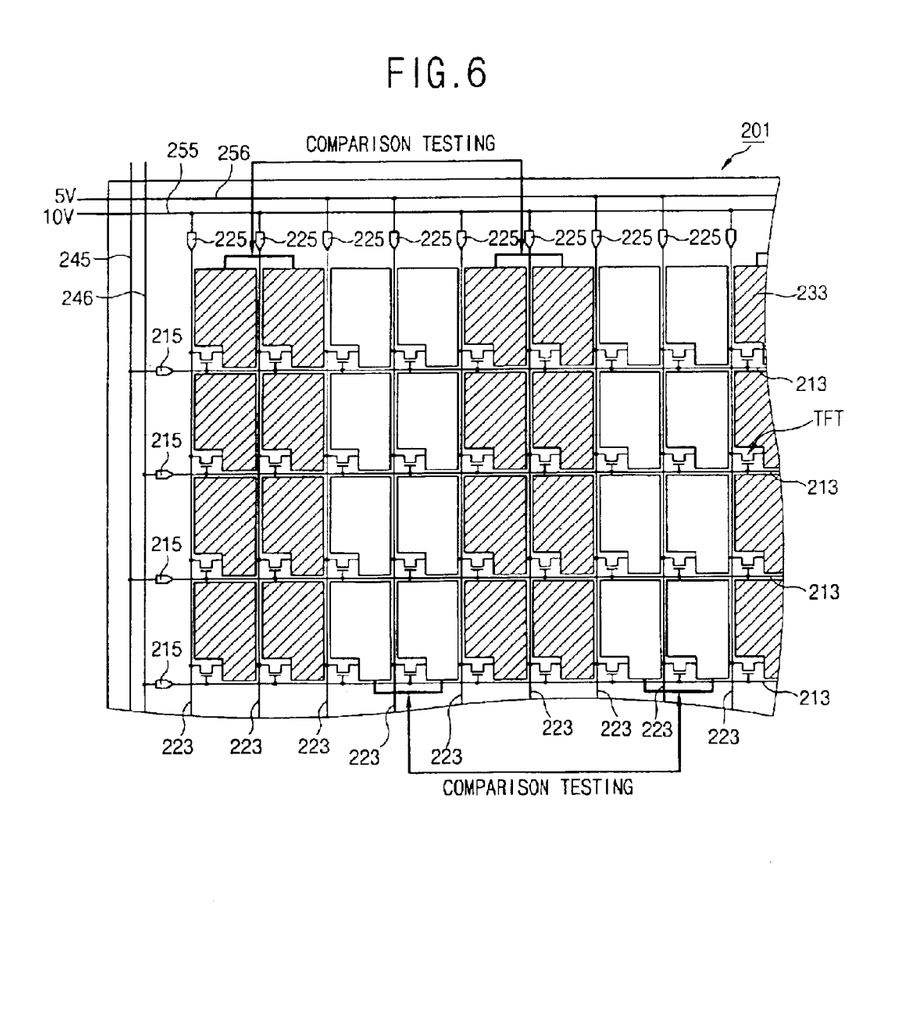
FIG. 6 is an exemplary view showing a liquid crystal display device having a shorting bar for testing a thin film transistor in accordance with a first embodiment of the invention.

FIG. 6 is an exemplary view showing a liquid crystal display device having a shorting bar for testing a thin film transistor in accordance with a first embodiment of the present invention.

With reference to FIG. 6, gate lines 213 are isolatedly arranged at regular intervals in lines on a substrate 201, and gate lines 213 and source lines 223 intersect each other. A unit liquid crystal cell is defined at every intersection region of the gate lines 213 and the source lines 223, and it includes a thin film transistor (TFT) and a pixel electrode 233 connected to a drain electrode (not shown) of the thin film transistor (TFT). A source electrode (not shown) of the TFT is connected to the source lines 223 and a gate electrode (not shown) is connected to the gate lines 213.

Gate pads 215 are formed at one ends of the gate lines 213 and connected to the gate lines 213, and first and second gate shorting bars 245 and 246 are formed connected to the gate pads 215. The first gate shorting bar 245 connects to the odd number gate pads 215 and the second gate shorting bar 246 connects to the even number gate pads 215.

Source pads 225 are formed at one end of each of the source lines 223 and are connected to the source lines 223. First and second source shorting bars 255 and 256 are formed connected to the source pads 225. Here, the first and second source shorting lines 255 and 256 are alternately connected to the source pads 225 in a two-by-two configuration.

For example, the first source shorting bar 255 is connected to first and second, fifth and sixth, and ninth and tenth source pads 225, and the second source shorting bar 256 is connected to third and fourth, seventh and eighth, and eleventh and twelfth source pads 225.

The process of testing the active panel having the shorting bar for testing a thin film transistor is described below.

First, when a gate turn-on voltage is applied to the first gate shorting bar 245 or the second gate shorting bar 246, the gate turn-on voltage is applied to the gate of the thin film transistor through the odd number or even number gate pads 215 and gate lines 213 of the active panel, so that the transistor TFT is turned on.

Then, when a test voltage is applied to the first and second shorting bars 255 and 256, the test voltage is applied to the source electrode of the thin film transistor TFT through the source pads 225 connected to the first and second source shorting bars 255 and 256 and the source lines 223 in an alternating two-by-two sequence.

The test voltage applied to the source electrode of the thin film transistor is applied to the drain electrode via a conductive channel of the turned-on thin film transistor. Since the drain electrode is connected to the pixel electrode 233, the test voltage is resultantly applied to the pixel electrode 233 connected to the drain electrode of the turned-on thin film transistor TFT of the active panel.

Different high and low test voltages are applied to the first and second source shorting bars 255 and 256. That is, for example, a 10V test voltage is applied to the first source shorting bar 255 and a 5V test voltage is applied to the second source shorting bar 256. However, the range of voltages are not restricted to the 5V/10V difference, and any appropriate voltage differential can be used.

Since first and second, fifth and sixth, and ninth and tenth source pads 225 are connected to the first source shorting bar 255, and third and fourth, seventh and eighth, and eleventh and twelfth source pads 225 are connected to the second source shorting bar 256, the adjacent two pixel electrodes 233 (to which the 10V test voltage has been applied through first and second, fifth and sixth, and ninth and tenth source pads 225 and source lines 223 connected thereto) are compared to each other to test an open defect. Also, adjacent two pixel electrodes 233 (to which the 5V test voltage has been applied through third and fourth, seventh and eighth, and ninth and twelfth source pads 225 and source lines 223 connected thereto) are compared to each other to test an open defect.

For example, after scanning (as one) two adjacent pixel electrodes 233, to which the 10V test voltage has been applied through the first and second source pads 225, and after scanning (as one) the two adjacent pixel electrodes 233, to which the 10V test voltage has been applied through the fifth and sixth source pads 225, these pixels are compared to each other to test an open defect.

Similarly, after scanning (as one) two adjacent pixel electrodes 233, to which the 5V test voltage has been applied through the third and fourth source pads 225, and after scanning (as one) two adjacent pixel electrodes 233, to which the 5V test voltage has been applied through the seventh and eighth source pads, these pixels are compared to each other to test an open defect.

Therefore, the liquid crystal display device having the shorting bar for testing a thin film transistor in accordance with the invention is much more effective when testing an active panel of a high resolution product which has a fine isolation distance between pixel electrodes and area.

Namely, compared to the conventional art, which can hardly be adapted to a high resolution product with its method of scanning individually pixel electrodes and comparing them, the two adjacent pixel electrodes are recognized as one in scanning and comparing to each other, so that the liquid crystal display device of the invention can be adapted to a high resolution product.

Figure 7:
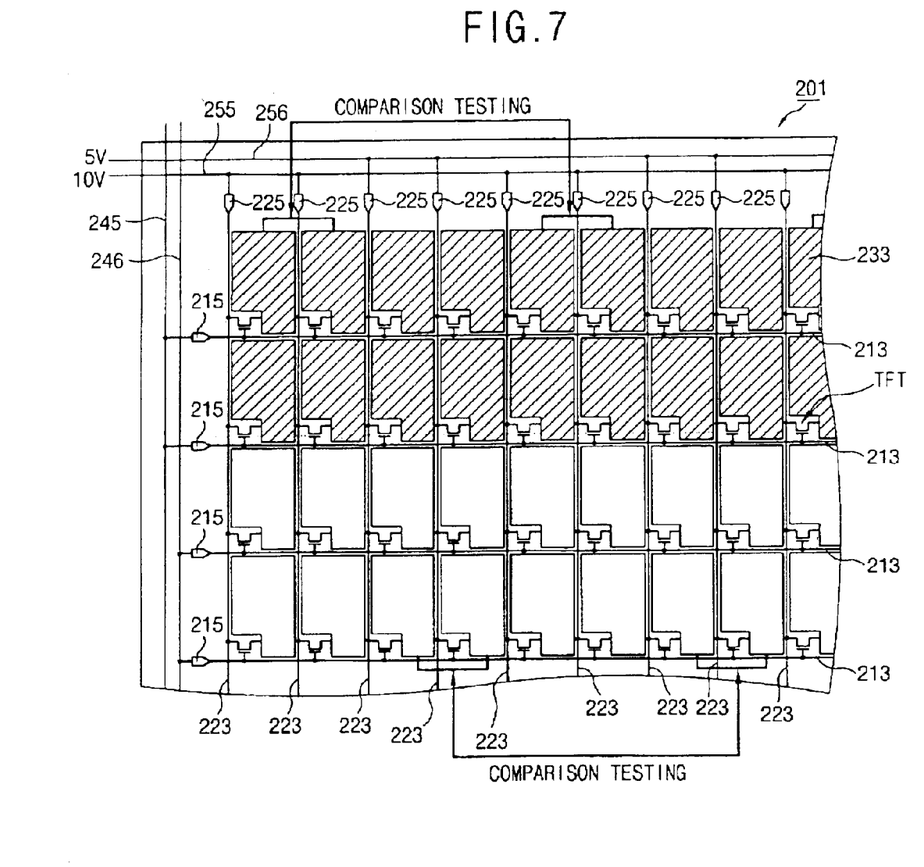
FIG. 7 is an exemplary view showing a liquid crystal display device having a shorting bar for testing a thin film transistor in accordance with a second embodiment of the invention.

Like the first and second source shorting bars, the first and second gate shorting bars also can be constructed to be connected alternately two-by-two to the gate pads as shown in FIG. 7.

Figure 8:
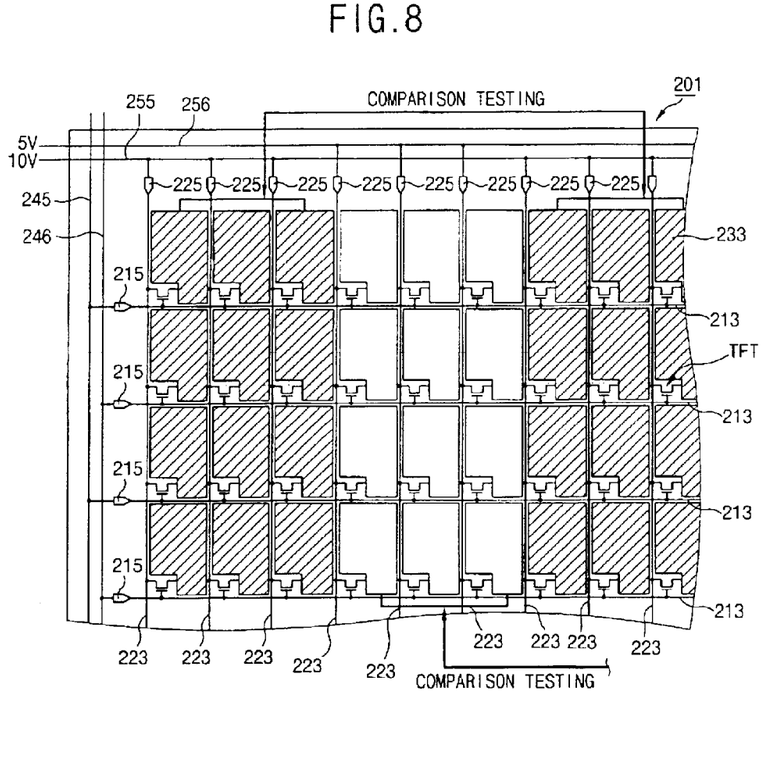
FIG. 8 is an exemplary view showing a liquid crystal display device having a shorting bar for testing a thin film transistor in accordance with a third embodiment of the invention.

Generally, a space taken up by two pixel electrodes in a high resolution product is almost as large as a space taken up by one pixel electrode of a low-resolution product. Thus, similarly as described above, the invention has the first and second source shorting bars alternately connected to the source pads in a two-by-two arrangement. But without being limited thereto, the first and second source shorting bars can be alternately connected to the source pads three-by-three depending on the isolation distance between the pixel electrodes and the area of the pixel electrode according to the resolution of the product, as shown in FIG. 8.

In addition, though not shown in the drawings, the first and second source shorting bars can be alterntely be connected to the source pads in more than three-by-three arrangements. Similarly, the first and second gate shorting bars can be alternately connected to the gate pads in more than three-by-three arrangements. For example, four-by-four, five-by-five or six-by-six configurations cn be used.

As has been shown, the liquid crystal display device having a shorting bar for testing a thin film transistor of the present invention has many advantages.

On advantage is that, since the first and second source shorting bars are alternately connected to the source pads by at least two-by-two, and the two pixel electrodes are recognized as one when scanned, an active panel of a high resolution product with a fine isolation distance between pixel electrodes and area can be tested. That is, the invention is effective in testing the enhanced numerical aperture products demanded by the consumers.

Accordingly, a defect generation rate of a high resolution product can be reduced to thereby improve yield and productivity. Thus, the unit cost of a product can be reduced.

It is to be understood that the foregoing descriptions and specific embodiments shown herein are merely illustrative of the best mode of the invention and the principles thereof, and that modifications and additions may be easily made by those skilled in the art without departing for the spirit and scope of the invention, which is therefore understood to be limited only by the scope of the appended claims.

What is claimed is:

1. A liquid crystal display device having thin film transistors, comprising:

gate lines and source lines arranged to intersect each other on a substrate;

gate pads connected to the gate lines at one ends of the gate lines and source pads connected to the source lines at one ends of the source lines;

at least one gate shorting bar connected to the gate pads; and first and second source shorting bars at least two-by-two alternately-connected to the source pads.

2. The device of claim 1, wherein first and second shorting bars are two-by-two alternately connected.

3. The device of claim 1, wherein the first and second source shorting bars are three-by-three alternately connected to the source pads.

4. The device of claim 1, further comprising:

a unit liquid crystal cell defined at every intersection region of the gate lines and the source lines; and a pixel electrode connected to the thin film transistor provided in the unit liquid crystal cell and a drain electrode of the thin film transistor.

5. The device of claim 4, wherein a gate electrode of the thin film transistor is connected to the gate lines and a source electrode thereof is connected to the source lines.

6. The device of claim 1, wherein the at least one gate shorting bar includes a first gate shorting bar and a second gate shorting bar, and wherein the first gate shorting bar is connected to odd number gate pads and the second gate shorting bar is connected to even number gate pads.

7. The device of claim 6, wherein the first and second gate shorting bars are at least two-by-two alternately connected to the gate pads.

8. A liquid crystal display device, comprising:

gate lines and source lines arranged to intersect each other on a substrate;

a unit liquid crystal cell defined at every intersection region of the gate lines and the source lines;

a thin film transistor provided in the unit liquid crystal cell and a pixel electrode connected to a drain electrode of the thin film transistor;

gate pads connected to the gate lines at one ends of the gate lines and source pads connected to the source lines at one ends of the source lines;

first and second gate shorting bars selectively connected to the gate pads; and first and second source shorting bars at least two-by-two alternately connected to the source pads.

9. The device of claim 8, wherein the first gate shorting bar is connected to odd number gate pads and the second gate shorting bar is connected to even number gate pads.

10. The device of claim 8, wherein the first and second gate shorting bars are at least two-by-two alternately connected to the gate pads.

11. A method for testing a liquid crystal display device, which comprises:

providing the liquid crystal display device having thin film transistors, the liquid crystal display device comprising gate lines and source lines arranged to intersect each other on a substrate, gate pads connected to the gate lines at one ends of the gate lines and source pads connected to the source lines at one ends of the source lines, at least one gate shorting bar connected to the gate pads, and first and second source shorting bars at least two-by-two alternately connected to the source pads;

applying different high and low test voltages to the first and second source shorting bars;

scanning, as one, adjacent pixel electrodes to which the same test voltage has been applied; and comparing the adjacent pixel electrodes to test for defects.

12. The method of claim 11, wherein the high voltage is about 10 volts and the low voltage is about 5 volts.

13. The method of claim 11, wherein the first and second source shorting bars are at least three-by-three alternatively connected to the source pads.

14. The method of claim 11, wherein the at least one gate shorting bar includes a first gate shorting bar and a second gate shorting bar, wherein the a first gate shorting bar is connected to odd number gate pads, and the second gate shorting bar is connected to even number gate pads.

15. The method of claim 14, wherein the first and second gate shorting bars are at least two-by-two alternately connected to the gate pads.

* * * * *